United States Patent Office 3,535,559
Patented Oct. 20, 1970

3,535,559
THYRISTOR CIRCUITS
Derek Stanley Adams, Acocks Green, Birmingham, England, assignor to Joseph Lucas (Industries) Limited, Birmingham, England, a British company
Filed June 13, 1967, Ser. No. 645,662
Claims priority, application Great Britain, June 27, 1966, 28,703/66
Int. Cl. H03k 17/00
U.S. Cl. 307—252                                    5 Claims

ABSTRACT OF THE DISCLOSURE

This invention relates to thyristor circuits of the kind in which a thyristor is connected in series with a load across a D.C. source. In order to turn the thyristor off when required, a capacitor is charged, and then at a later point in the cycle the capacitor voltage is reversed. The thyristor can then be turned off by connecting the capacitor across the thyristor to reverse bias the thyristor. In such arrangements, a diode is usually connected across the load, and the invention resides in connecting an inductor in series with this diode, which enables charging of the capacitor to a voltage in excess of battery voltage.

---

This invention relates to thyristor circuits.

A thyristor circuit according to the invention comprises in combination first and second terminals which in use are connected to the positive and negative terminals of a D.C. source, a thyristor having its cathode connected to the second terminal and its anode connected to the first terminal through an inductive load, a diode connected across the load with its cathode connected to the first terminal and its anode connected to the anode of the thyristor, an impedance in series with said diode across the load, a switch and a capacitor connected across the anode-cathode path of the thyristor, means for reversing the voltage across said capacitor, and switching means operable during a cycle to permit charging of said capacitor through said load and said switch to permit firing of the thyristor so that current flows in the load, to reverse the voltage across the capacitor and finally to turn said switch on so that the capacitor reverse biases the thyristor to turn it off, said diode serving to limit the back E.M.F. when the current flowing through the load is interrupted, and said impedance in series with the diode delaying the action of the diode so that the capacitor charges to a voltage in excess of the voltage between the first and second terminals.

Figure 1:
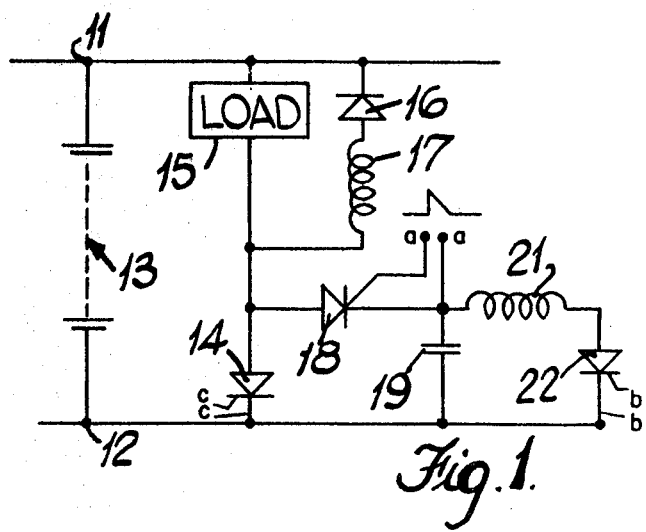
Figure 2:
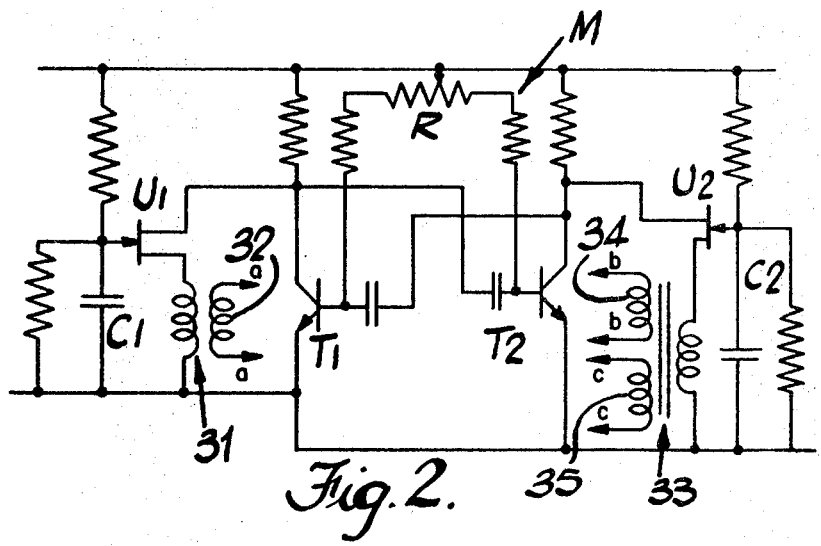

In the accompanying drawings, FIG. 1 is a circuit diagram illustrating one example of the invention, and FIG. 2 illustrates a suitable form of switching means.

Referring to FIG. 1, there are provided first and second terminals 11, 12 which in use are connected to the positive and negative terminals of a battery 13. Connected to the terminal 12 is the cathode of a thyristor 14, the anode of which is connected to the terminal 11 through an inductive load 15, which may for example be a motor. The terminal 11 is further connected to the cathode of a diode 16, the anode of which is connected through an inductor 17 to the anode of the thyristor 14, the anode of the thyristor 14 being further connected to the anode of a thyristor 18, the cathode of which is connected to the terminal 12 through a capacitor 19. The cathode of the thyristor 18 is also connected through an inductor 21 to the anode of a thyristor 22, the cathode of which is connected to the terminal 12.

Any convenient switching means is provided for firing the thyristors, and ignoring for the moment the diode 16 and inductor 17, the operation is as follows:

At the commencement of a cycle of the thyristor 18 is conducting, and the capacitor 19 charges through the inductive load 15 and the thyristor 18 to a value in excess of the voltage of the battery 13. When the capacitor 19 is charged, the current flowing through the thyristor 18 falls below its holding value, and so the thyristor 18 turns off. At some later point in the cycle, the thyristor 22 is fired to reverse the voltage across the capacitor 19, reversal of the voltage causing the thyristor 22 to turn off. The thyristor 14 is fired at some point during the cycle so that current flows in the load 15, and at the end of the cycle the thyristor 18 is fired again, so that the capacitor 19 reverse biases the thyristor 14 to turn it off. The thyristor is at this point conducting and the cycle re-commences with charging of the capacitor 19. Preferably, the thyristors 14, 22 are fired at the same time, the time during a cycle at which the thyristor 14 is fired determining the mean current flow in the load 15.

Using an arrangement as described above, the various components in the circuit could be damaged by the reverse voltage developed, and so it is necessary to provide the diode 16 to limit this reverse voltage. However, if the diode 16 alone were connected across the load 15, it would prevent the capacitor 19 from being charged to a voltage in excess of the battery voltage. For this reason, the inductor 17 is incorporated in series with the diode 16. The effect of the inductor 17 is to delay the action of the diode and allow the capacitor 19 to be charged to a higher voltage than the battery voltage, whilst at the same time permitting the diode 16 to protect the load 15 in the required manner. The inductor could be replaced by a resistor, or an inductor and a resistor could be connected in series with the diode 16.

FIG. 2 illustrates a suitable form of switching means using a fixed frequency multivibrator M of known form having transistors T1, T2 and a variable resistor R which determines the relative periods of conduction of the transistors T1, T2. The circuit further includes a transformer 31 having a secondary winding 32 connected to the gate-cathode of the thyristor 18 as shown as a—a, and a transformer 33 having secondary windings 34, 35 connected to the thyristors 22, 14 as shown at b—b and c—c respectively. The primary windings of the transformers are connected in series with base terminals of unijunction transistors U1, U2 the emitter potentials of which are determined by capacitors C1, C2 respectively. The potentials across the capacitors C1, C2 are insufficient to break down the transistors U1, U2 when the transistors are connected across the supply lines, but when the transistor T1 conducts, the inter-base voltage of the transistor U1 is reduced and the transistor U1 breaks down, discharge of the capacitor C1 turning the thyristor 18 on. At a later point in the cycle, determined by the resistor R, the transistor T2 conducts and the capacitor C2 discharges through the transistor U2 to turn on the thyristors 22, 14.

Having thus described my invention what I claim as new and desire to secure by Letters Patent is:

1. A thyristor circuit comprising in combination first and second terminals which in use are connected to the positive and negative terminals of a D.C. source, a thyristor having its cathode connected to the second terminal and its anode connected to the first terminal through an inductive load, a diode connected across the load with its cathode connected to the first terminal and its anode connected to the anode of the thyristor, an impedance in series with said diode across the load, a switch and a capacitor connected across the anode-cathode path of the thyristor, means for reversing the voltage across said capacitor, and switching means operable during a cycle to permit charging of said capacitor through said load and said switch to permit firing of the thyristor so that current flows in the load, to reverse the voltage across the capacitor and finally to turn said switch on so that the capacitor reverse biases the thyristor to turn it off, said diode serving to limit the back E.M.F. when the current flowing through the load is interrupted, and said impedance in series with the diode delaying the action of the diode so that the capacitor charges to a voltage in excess of the voltage between the first and second terminals.

2. A circuit as claimed in claim 1 in which said switch is a second thyristor.

3. A circuit as claimed in claim 2 in which the means for reversing the capacitor voltage comprises a third thyristor connected in series with an inductor across the capacitor.

4. A circuit as claimed in claim 3 in which the first and third thyristors are fired at the same time by the switching means.

5. A circuit as claimed in claim 1 in which said impedance is constituted by an inductor.

References Cited

UNITED STATES PATENTS

| | | | |
|---|---|---|---|
| 3,243,605 | 3/1966 | Smith et al. | 307—252 |
| 3,259,829 | 7/1966 | Feth | 307—252 XR |
| 3,431,436 | 3/1969 | King | 307—252 |

OTHER REFERENCES

IBM Technical Disclosure Bulletin, titled Switch Voltage Regulator, written by E. A. Menard and J. R. Cielo, January 1964, vol. 6, No. 8, pp. 31 and 32.

STANLEY T. KRAWCZEWICZ, Primary Examiner

U.S. Cl. X.R.

307—247, 284